(12) United States Patent
DeMarco et al.

(10) Patent No.: US 7,869,987 B2
(45) Date of Patent: Jan. 11, 2011

(54) METHODS INVOLVING TRANSLATING TEXT EMPHASIS

(75) Inventors: Elizabeth A DeMarco, Lowell, MS (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 11/949,169

(22) Filed: Dec. 3, 2007

(65) Prior Publication Data

US 2009/0144047 A1    Jun. 4, 2009

(51) Int. Cl.
*G06F 17/28* (2006.01)
(52) U.S. Cl. .................. 704/2; 704/277; 704/5
(58) Field of Classification Search ............. 704/1, 704/2, 3, 4, 5, 277, 8, 9
See application file for complete search history.

(56) References Cited

U.S. PATENT DOCUMENTS

| | | |
|---|---|---|
| 6,418,435 B1 | 7/2002 | Chase |
| 6,622,140 B1 | 9/2003 | Kantrowitz |
| 6,876,728 B2 | 4/2005 | Kredo et al. |
| 6,993,473 B2 * | 1/2006 | Cartus ........................ 704/2 |
| 6,999,914 B1 | 2/2006 | Boerner et al. |
| 7,110,937 B1 * | 9/2006 | Lei et al. .................... 704/2 |
| 7,346,487 B2 * | 3/2008 | Li ............................. 704/2 |
| 7,680,646 B2 * | 3/2010 | Lux-Pogodalla et al. ....... 704/2 |

FOREIGN PATENT DOCUMENTS

WO    2002041191 A1    5/2002

* cited by examiner

*Primary Examiner*—Huyen X. Vo
(74) *Attorney, Agent, or Firm*—Cantor Colburn LLP; Raymond Szeto

(57) ABSTRACT

An exemplary method for translating emphasis in text, the method comprising, receiving text in a first language, determining a first emphasis associated with the first language in the text, comparing the first emphasis with emphases associated with a second language to determine a second emphasis associated with the second language corresponding to the first emphasis, converting the text in the first language having the first emphasis into text having the second emphasis associated with the second language, and outputting the converted text to a display.

2 Claims, 3 Drawing Sheets

METHODS INVOLVING TRANSLATING TEXT EMPHASIS

BACKGROUND OF THE INVENTION

1. Field of the Invention

This invention relates generally to methods for translating text, and specifically to translating emphasis and style in text.

2. Description of Background

Translation engines are used to translate words in one language into another language. Often the translation engines use dictionaries and algorithms to translate text into different languages. Users who type text often emphasize words in the text by using, for example, all capital letters and other types of symbols and styles. The types of symbols and styles used to emphasize words in text are different in different countries and different languages. Emphasized text in one language may have a different meaning when translated into another language.

SUMMARY OF THE INVENTION

The shortcomings of the prior art are overcome and additional advantages are achieved through an exemplary method for translating emphasis in text, the method comprising, receiving text in a first language, determining a first emphasis associated with the first language in the text, comparing the first emphasis with emphases associated with a second language to determine a second emphasis associated with the second language corresponding to the first emphasis, converting the text in the first language having the first emphasis into text having the second emphasis associated with the second language, and outputting the converted text to a display.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Methods involving translating emphasis in text are provided. Several exemplary embodiments are described.

Previous text translation tools use algorithms and dictionaries to translate text from one language to another. The text translation tools are used in, for example, word processing software, web browsers, email programs, and instant message chat programs. Users who type text often use stylistic modifiers to emphasize text. The stylistic modifiers often convey different tones and add meaning to the text. For example, users in the United States may use all capital letters to emphasize text while in Germany the spacing of letters may be used to convey a similar emphasis. Previous translation programs fail to translate the stylistic emphasis in text. Since the stylistic emphasis of text may be necessary for a reader to properly understand the text, a method that translates the stylistic emphasis of text in one language to text in another language is desirable.

Figure 2:
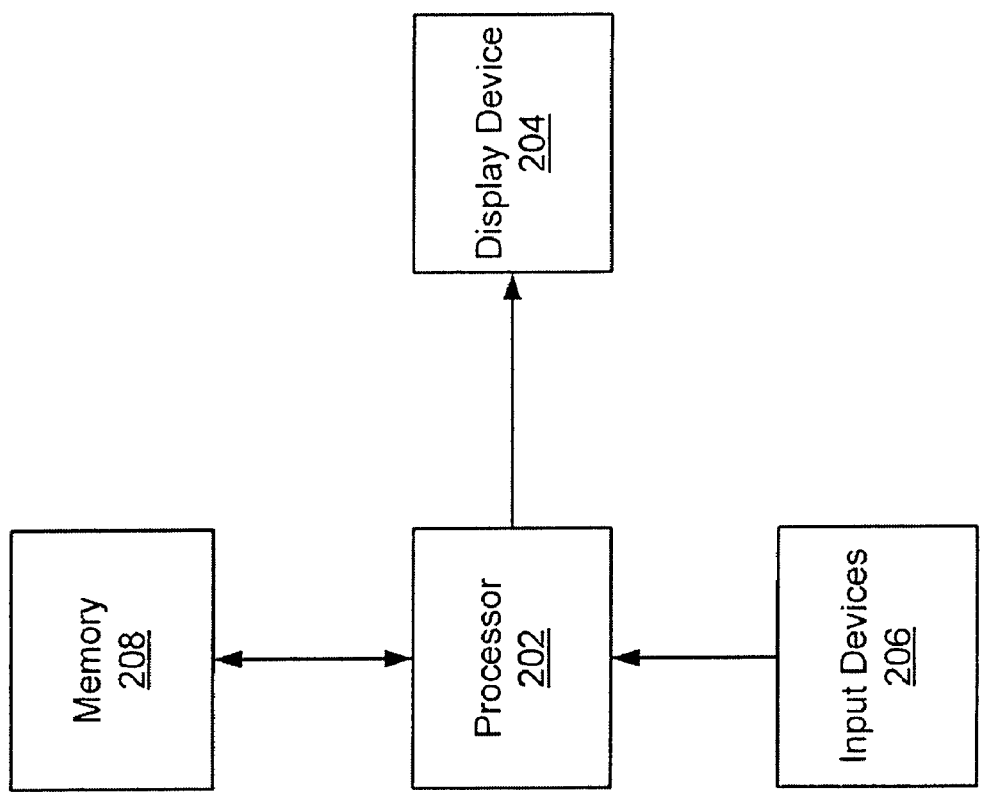
FIG. 2 illustrates an exemplary system for translating emphasis in text.

FIG. 2 illustrates an exemplary embodiment of a system for translating emphasis in text. The exemplary system includes a processor 202 communicatively linked to a display device 204, a memory 208, and input devices 206.

Figure 1:
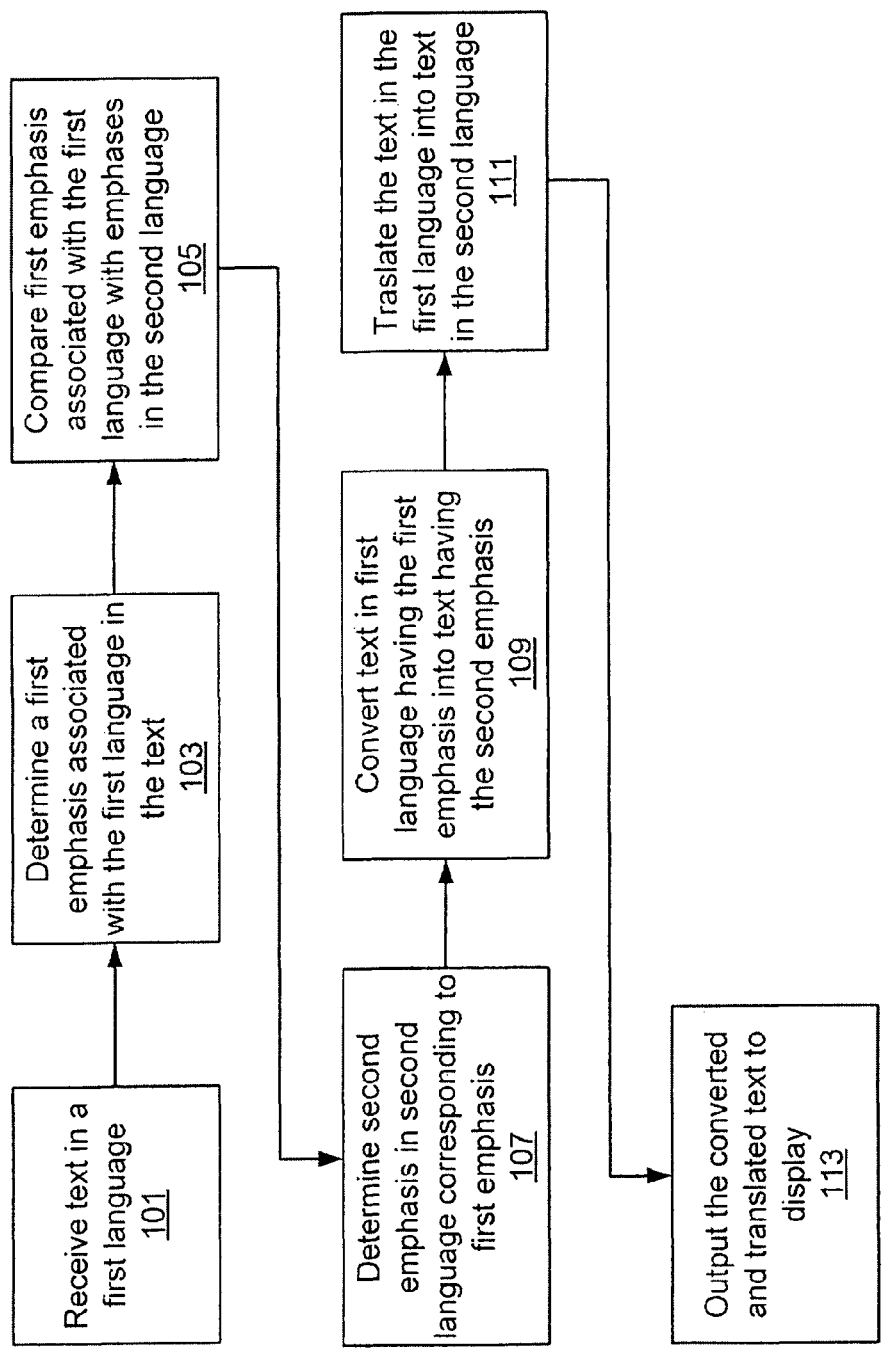
FIG. 1 illustrates a block diagram of an exemplary method for translating emphasis in text.

FIG. 1 illustrates a block diagram of an exemplary method for translating emphasis in text from a first language into a second language. In block 101, text is received in a first language, such as, for example English. In block 103, the text is processed to determine a first emphasis that is associated with the first language in the text. A first emphasis may include, for example, all capital characters. Once a portion of text is found that has the first emphasis, the first emphasis is compared with a list of emphases associated with the second language in block 105. For example, if the second language is Chinese, one convention for emphasizing Chinese characters is placing a black dot under emphasized characters. Since the first emphasis, all capital letters in English corresponds to a black dot in Chinese, block 107 would determine that the second emphasis is a black dot. In block 109, the text in the first language (e.g., English) having the first emphasis (e.g., all capital letters) is converted into text having the second emphasis (e.g., a black dot). The operations shown in blocks 101 to 109 may be repeated as necessary until all of the emphases in the text are converted. In block 111, the text in the first language may be translated into text in the second language. In block 113, the converted and translated text may be output to a display. The text may also be saved in a file for later use.

Though the emphasis used in text may be converted in different languages, some users may prefer specific types of emphases to others even if the languages are the same. A user may configure the system to convert to emphases preferable to the user. Additionally, some countries that use the same language for example, the United States and Great Britain use different conventional emphases, thus it may be desirable to convert emphases between countries that use the same language. Such a conversion would be accomplished in a similar method as described above.

Figure 3:
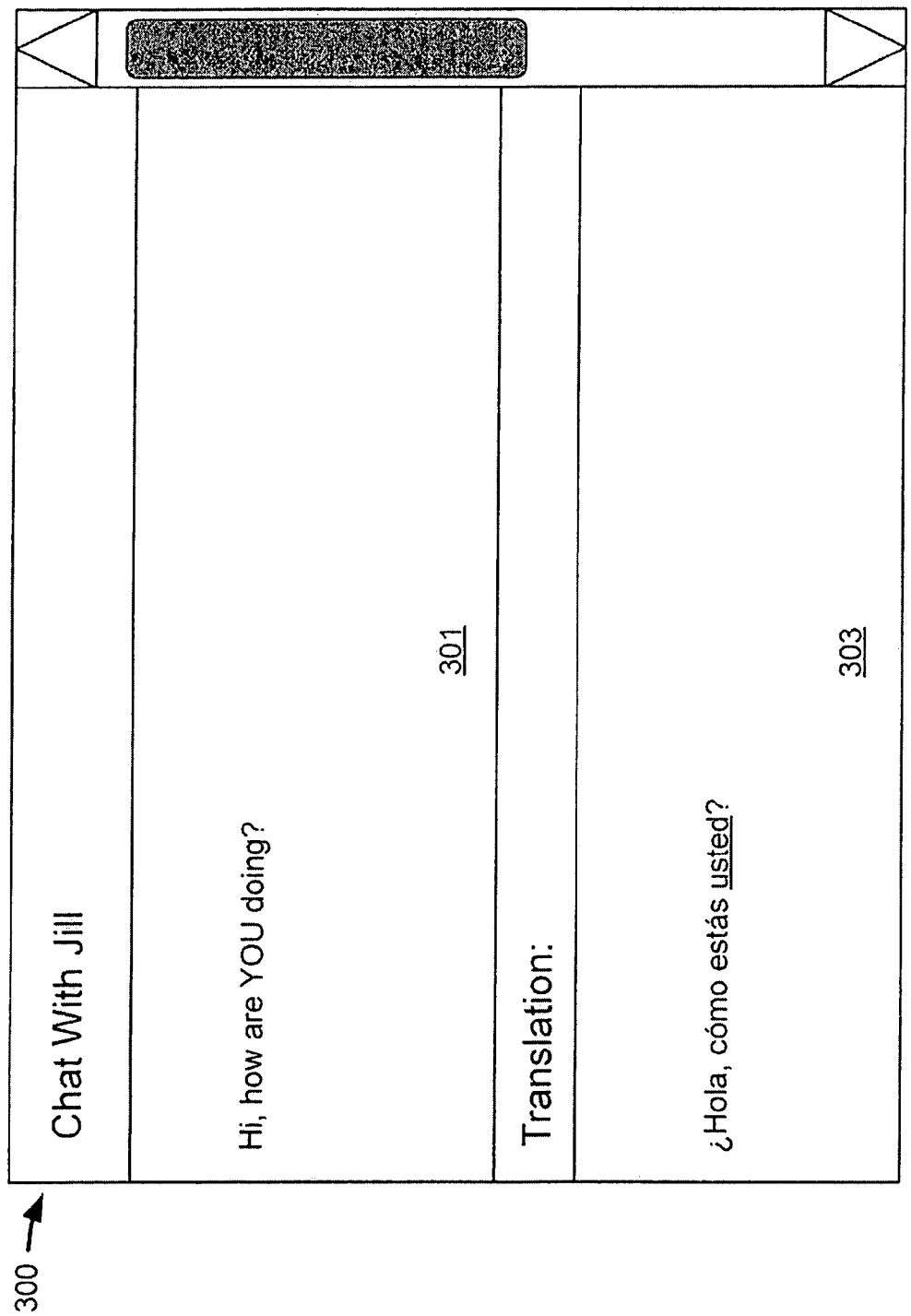
FIG. 3 illustrates an exemplary embodiment of an output of the method shown in FIG. 1.

FIG. 3 illustrates an example of an instant message chat session window 300 that has converted and translated the English text "Hi how are YOU doing?" in window 301 to Spanish "¿Hola, cómo estás usted?" (with "usted" underlined) in window 303. The emphasized text "YOU" has been converted into the emphasized text, an underlined "usted."

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for translating emphasis in text, the method comprising:
   receiving text in a first language;
   determining a first emphasis associated with the first language in the text;
   comparing, with a processor, the first emphasis with emphasis associated with a second language to determine a second emphasis associated with the second language corresponding to the first emphasis;
   converting the text in the first language having the first emphasis into text having the second emphasis associated with the second language; and
   outputting the converted text to a display.

2. The method of claim 1, the method further comprising translating the text in the first language into text in the second language responsive to converting the text.

* * * * *